United States Patent [19]
Kohlmeier et al.

[11] Patent Number: 5,294,165
[45] Date of Patent: Mar. 15, 1994

[54] DEVICE FOR DAMPING TORSIONAL VIBRATIONS

[75] Inventors: Hans-Heinrich Kohlmeier, Mönsheim; Heinz Bayer, Ulm, both of Fed. Rep. of Germany

[73] Assignee: Porsche AG, Fed. Rep. of Germany

[21] Appl. No.: 962,647

[22] Filed: Oct. 19, 1992

Related U.S. Application Data

[63] Continuation-in-part of Ser. No. 769,367, Oct. 1, 1991.

[30] Foreign Application Priority Data

Oct. 1, 1990 [DE] Fed. Rep. of Germany ....... 4030990
Oct. 19, 1991 [DE] Fed. Rep. of Germany ....... 4134674

[51] Int. Cl.$^5$ ................................................ B60J 1/20
[52] U.S. Cl. .................... 296/96.21; 280/758; 188/379
[58] Field of Search ............ 296/96.21, 186, 203, 296/210; 280/758, 782, 784; 188/379, 380; 267/136, 141; 248/559

[56] References Cited

U.S. PATENT DOCUMENTS

| | | | |
|---|---|---|---|
| 1,380,996 | 6/1921 | Martin | 296/96.21 X |
| 3,438,648 | 4/1969 | Tolley | 280/758 |
| 3,606,380 | 9/1971 | Lewis | 280/758 |
| 3,614,126 | 10/1971 | Carlson | 280/758 |

FOREIGN PATENT DOCUMENTS

| | | |
|---|---|---|
| 411207 | 3/1971 | Australia . |
| 52291 | 5/1982 | European Pat. Off. . |
| 98657 | 1/1984 | European Pat. Off. . |
| 374610 | 6/1990 | European Pat. Off. . |

Primary Examiner—David M. Mitchell
Assistant Examiner—Andrew C. Pike
Attorney, Agent, or Firm—Evenson, McKeown, Edwards & Lenahan

[57] ABSTRACT

In a device for damping torsional vibrations of the body of a convertible vehicle, an elastically mounted weight is used. The damper is mounted elastically on a frame of a windshield by slide bearings and at a distance from the frame, relatively free to vibrate in the transverse directions of the vehicle. The damper has a frequency equal to the torsional natural frequency of the vehicle in the area of the frame, with the bearings having a sliding resistance determined by their geometry. The damper is elastically mounted by at least one central slide bearing on the frame element, with the damping weight having a leaf spring element at each end and mounted to abut the frame element and to permit transverse movement of the damping weight.

6 Claims, 3 Drawing Sheets

DEVICE FOR DAMPING TORSIONAL VIBRATIONS

This is a continuation-in-part application of parent application Ser. No. 07/769,367, filed Oct. 1, 1991.

The invention relates to a device for damping torsional vibrations according to the above-noted parent application.

In convertible vehicles, the fact that the structure has less torsional rigidity in contrast to coupes results in vibration and oscillation, especially in the area of the windshield, so that for example the rear-view mirror fastened to the windshield undergoes such vibrations that it becomes more difficult to obtain a clear rear view.

Vibration dampers for various applications in motor vehicle construction are known, for example a driveshaft disclosed in German Patent Document DE-OS 36 32 418 and a drive unit disclosed in German Patent Document DE-PS 31 25 830. These dampers are held in elastic bushings restricted by space limitations to a space that is sufficient for optimum vibration damping.

An object of the invention is to provide a vibration damper in a convertible to guarantee that damping of vibrations is optimally tuned to the natural torsional frequencies of the vehicles.

This object is achieved according to the invention by providing an arrangement wherein the damper is elastically supported by means of at least one central slide bearing on a frame element, with a damping weight having a leaf spring element mounted at each end and mounted to abut the frame element to permit transverse movement of the damping weight.

The above-noted parent application describes a vibration damper in the windshield frame of a convertible, said damper being held endwise in elastic slide bearings and supported by the in the frame. These bearings are designed to be very much softer transversely of the vehicle than in the vertical and lengthwise directions.

According to the present invention, in contrast to the above-noted parent application, in which endwise-located elastic rubber bearings are used as slide bearings, special leaf springs are used to ensure deliberate transverse displacement of the weight in cooperation with a slide bearing located centrally on the damping weight, and with the leaf springs suppressing deflection heightwise and lengthwise of the vehicle, ensuring deliberate guidance of the damping weight.

The primary advantages achieved with the invention consist in the fact that vibrations at the windshield frame can be reduced by the damper to the point where, for example, unimpeded rear views through the mirror mounted on the windshield or on the frame are possible. In addition, the usual vibration behavior, especially in the dashboard area with the steering wheel, is considerably improved.

The damper is mounted on a frame element connectable with the upper window frame of the vehicle. This is accomplished by at least one central slide bearing and the leaf spring elements mounted at the free ends of the damping weight. The damping weight is held by the leaf spring elements in such fashion that only transverse motion can occur and motion in other directions is largely eliminated.

The slide bearing is mounted freely in a recess in the damping weight so that unimpeded transverse motion of the damping weight can occur. Guidance in this direction is provided by the leaf spring elements mounted endwise which are accordingly made rigid heightwise and lengthwise and soft transversely.

When two slide bearings mounted side by side at a distance apart are used in the damping weight, a wider bearing base for the damping weight in the transverse direction is guaranteed than with only one slide bearing.

Other objects, advantages and novel features of the present invention will become apparent from the following detailed description of the invention when considered in conjunction with the accompanying drawings.

DETAILED DESCRIPTION OF THE DRAWINGS

Figure 1:
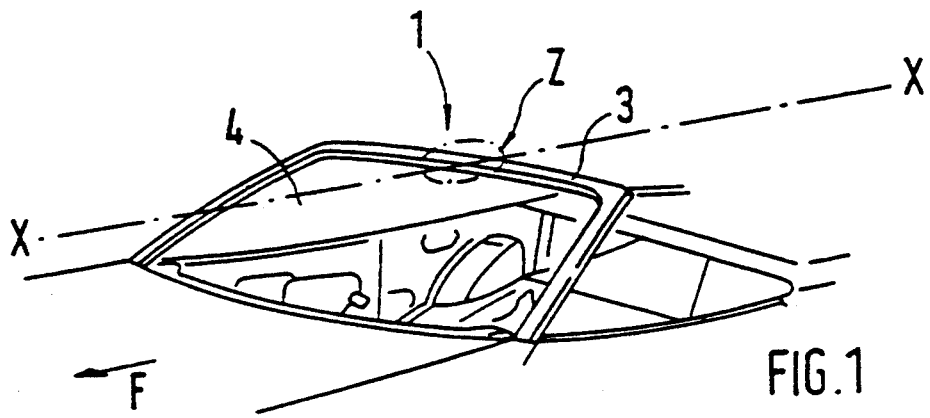
FIG. 1 is a schematic diagram of an installation location for the vibration damper in the window frame, constructed according to a preferred embodiment of the present invention.
Figure 2:
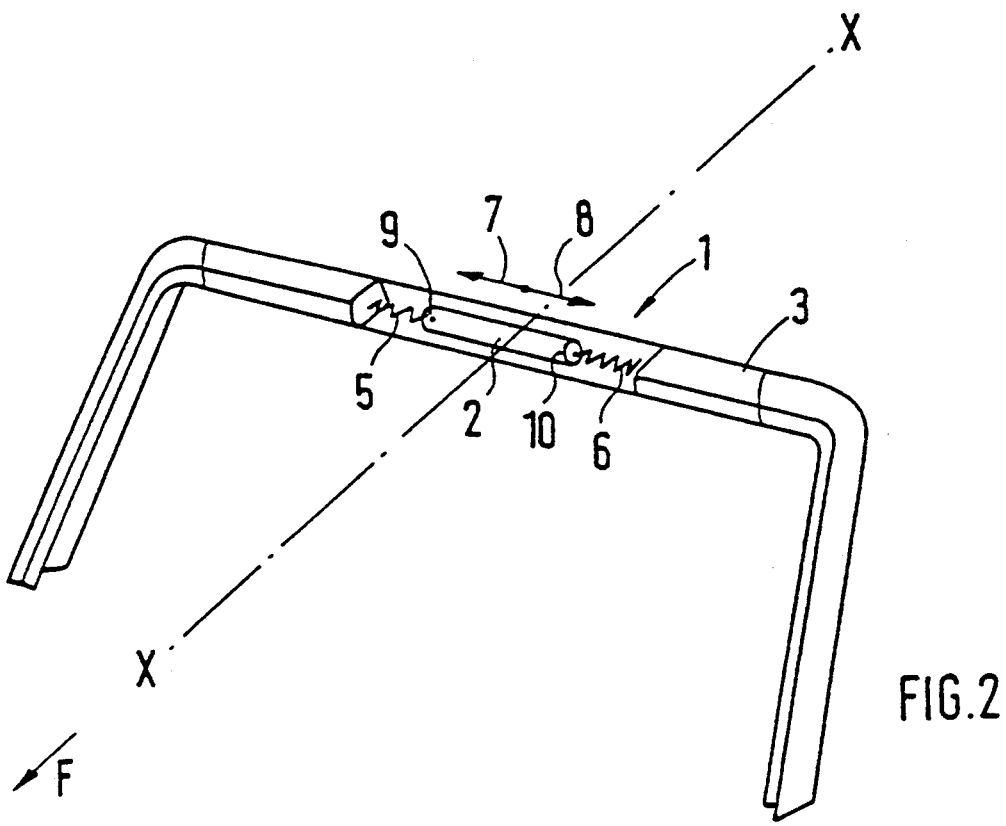
FIG. 2 is an enlarged view Z from FIG. 1 of the vibration damper in the upper window frame.
Figure 3:
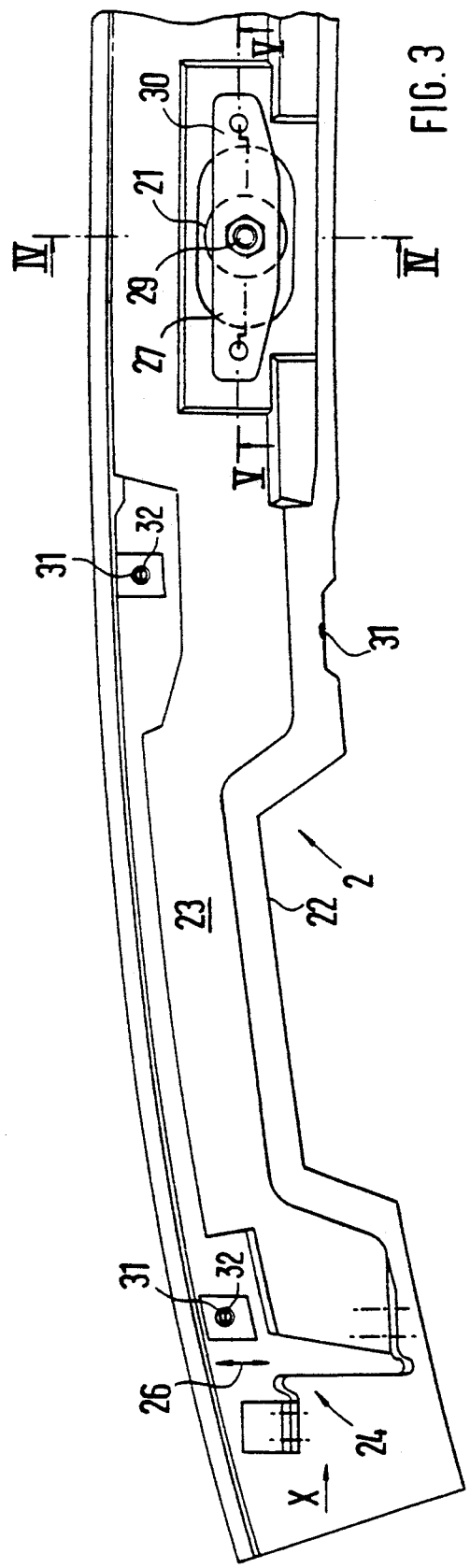
FIG. 3 is a top view of a damper with endwise leaf spring elements and a central slide bearing; constructed according to the preferred embodiment of the invention.
Figure 4:
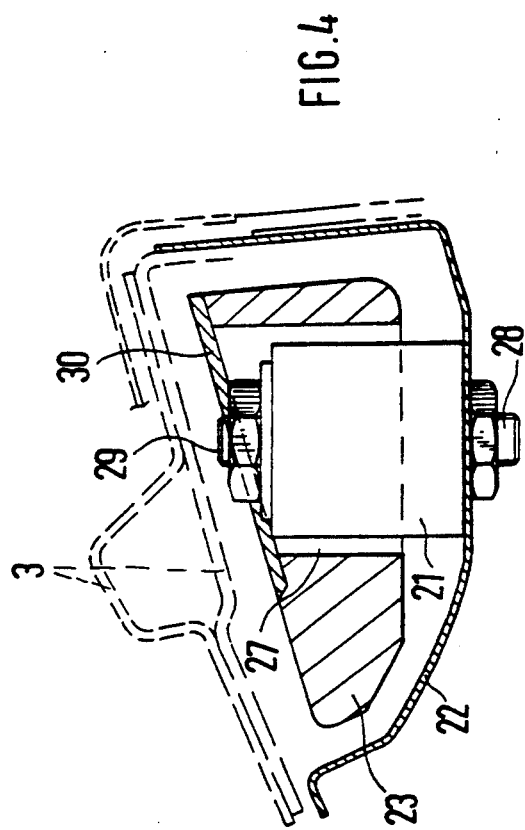
FIG. 4 is a section along line IV—IV in FIG. 3.
Figure 5:
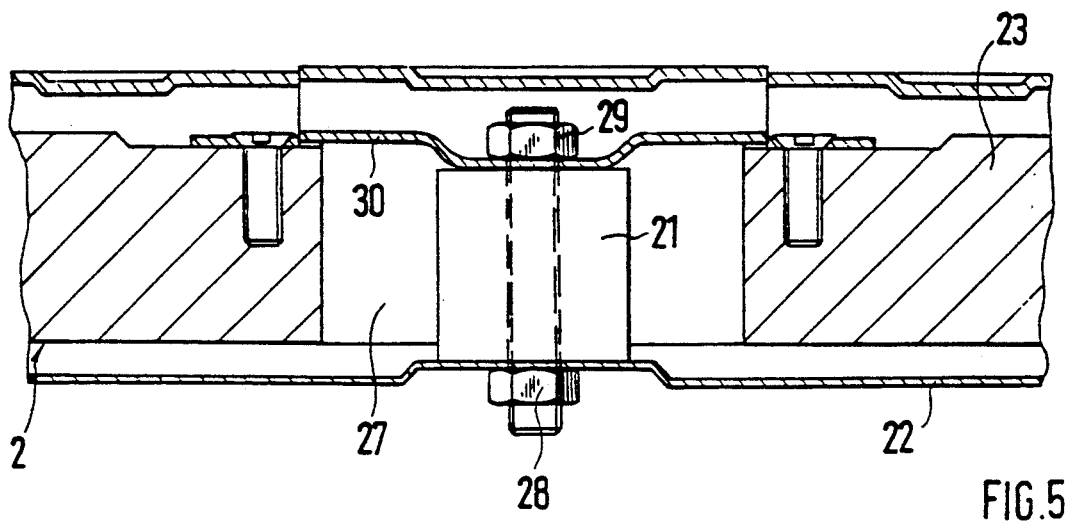
FIG. 5 is a section along V—V in FIG. 3.
Figure 6:
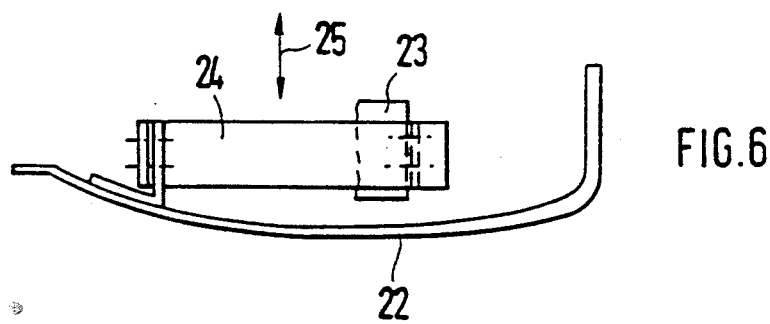
FIG. 6 is a view taken in direction X in FIG. 3.

Device 1 for damping torsional vibrations according to the parent application and shown in FIGS. 1 and 2 comprises a damper 2 on upper window frame 3 and on the roof frame of a windshield 4, said damper being mounted to be movable on elastic bearings schematically depicted at 5 and 6 in the directions of arrows 7 and 8 with vibrations approximately horizontally. The sliding resistance of the bearings 5, 6 may be determined by their geometry. Damper 2 consists of metal material with as high a specific gravity as possible, for example steel, lead, or similar material, and is mounted endwise, i.e. at its free ends 9 and 10, in these elastic bearings 5 and 6. As shown in FIGS. 3-6, the damper 2 according to an improvement can also be supported in an elastically movable fashion in transverse directions 7, 8 by means of at least one central slide bearing 21 on a frame element 22. The central slide bearing may abut the frame element. The free ends of damping weight 23 are each connected with a leaf spring element 24 guiding damping weight 23 in transverse directions 7 and 8. For this purpose leaf spring elements 24 are guided in a relatively rigid fashion in vertical directions 25 and lengthwise directions 26, and more softly on the other hand in transverse directions 7 and 8.

Slide bearing 21 is accommodated in a recess 27 of damping weight 23 and fastened by one end 28 to frame element 22 and connected by another end 29 via a holder 30 with damping weight 23. Instead of one bearing 21, two or more bearings can also hold damping weight 23 so it is movable in transverse directions 7 and 8.

Bearing 21, designed for example as a round bearing, is dimensioned to have a characteristic that permits the least amount of movement of damping weight 23 in the heightwise and lengthwise directions but is suitably tuned to the torsional natural frequency of the body to permit elastic movement transversely. Endwise leaf spring elements 24 have a specified height and thickness to ensure exact guidance of damping weight 23 in the transverse directions without deflection in the vertical and lengthwise directions.

Frame element 22, designed as a half shell, receives damper 2 and is connectable as a structural unit by screws 32 with window frame 3, likewise made in the form of a half shell. Corresponding holes 31 for accommodating the screws 32 are shown in greater detail in FIG. 3. After frame element 22 is fastened to window frame 3, the frame forms a closed unit with internal damper 2.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Device for damping torsional vibrations in the body of a convertible vehicle, comprising: a damper being mounted elastically on a frame of a windshield by slide bearings and mounted to be freely oscillating at a distance from the frame in the transverse direction of the vehicle, the damper having a frequency equal to the torsional natural frequency of the vehicle in the vicinity of the frame, and the bearings having a sliding resistance determined by their geometry, wherein the slide bearings include at least one central slide bearing on a frame element, with a damping weight having a leaf spring element mounted at each end and mounted to abut the frame element to permit movement of the damping weight in the transverse direction.

2. Device according to claim 1, wherein at least one of the leaf spring elements is rigid in vertical lengthwise directions but soft in the transverse direction of the vehicle.

3. Device according to claim 2, wherein the frame element is designed as an accessory with the damper held by the at least one central slide bearing and the leaf spring elements, and fastenable by screws to a window frame.

4. Device according to claim 1, wherein at least one central slide bearing is accommodated in a recess of the damping weight and abuts the frame element and is connected to the damping weight with a holder.

5. Device according to claim 4, wherein the frame element is designed as an accessory with the damper held by the at least one central slide bearing and the leaf spring elements, and fastenable by screws to a window frame.

6. Device according to claim 1, wherein the frame element is designed as an accessory with the damper held by the at least one central slide bearing and the leaf spring elements, and fastenable by screws to a window frame.

* * * * *